United States Patent [19]

Mühlratzer et al.

[11] Patent Number: 4,927,702

[45] Date of Patent: May 22, 1990

[54] THERMAL INSULATING MATERIAL

[75] Inventors: August Mühlratzer, Krailling; Karin Handrick, Dachau; Siegfried Lassmann, Gröbenzell; Alfred Hirt, Munich, all of Fed. Rep. of Germany

[73] Assignee: Man Technologie AG, Munich, Fed. Rep. of Germany

[21] Appl. No.: 154,141

[22] Filed: Feb. 9, 1988

[30] Foreign Application Priority Data

Feb. 20, 1987 [DE] Fed. Rep. of Germany ....... 3705440

[51] Int. Cl.$^5$ ............................................. B32B 7/02
[52] U.S. Cl. ................................ 428/215; 428/288; 428/457; 428/472; 428/701; 428/912.2
[58] Field of Search ............ 428/434, 288, 289, 912.2, 428/472, 457, 215; 244/117 A

[56] References Cited

U.S. PATENT DOCUMENTS

| | | |
|---|---|---|
| 3,799,056 | 3/1974 | Colignon .................. 244/117 A |
| 4,612,240 | 9/1986 | Johnson et al. .................. 428/289 |
| 4,624,896 | 11/1986 | Watanabe et al. .............. 428/472 X |
| 4,751,205 | 6/1988 | Hill et al. ..................... 428/288 X |

FOREIGN PATENT DOCUMENTS 2190929 12/1987 United Kingdom ............... 428/289

*Primary Examiner*—Thomas J. Herbert
*Attorney, Agent, or Firm*—Ladas & Parry

[57] ABSTRACT

A heat insulating structure of ceramic material for high temperatures is made up of a plurality of reflective layers in order to provide protection against the action of heat for short periods of time. The reflective layers are made up of a substrate of impregnated, fired ceramic fiber and a noble metal layer. The heat insulating structure is made up of a plurality of such parallel spaced reflective layers.

7 Claims, 1 Drawing Sheet

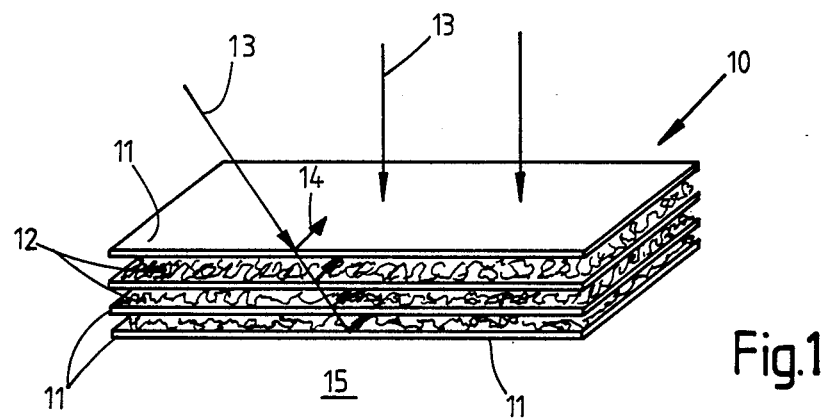
Fig. 1
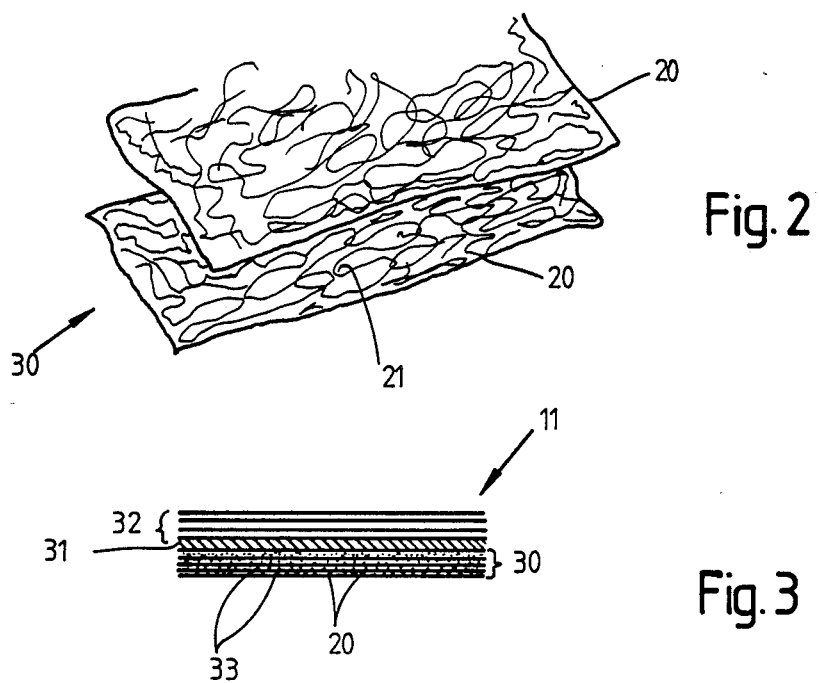
Fig. 2
Fig. 3

THERMAL INSULATING MATERIAL

BACKGROUND OF THE INVENTION

The invention relates to thermal insulating materials composed essentially of ceramic material and suitable for use at high temperatures.

Thermally insulating materials have been proposed in a large number of different forms. Their main characterizing features are the nature of the material, their thermal conductivity and the thickness of the insulating layer. There are applications, as for example in space technology, in which a further criterion, i.e. weight, that is to say minimum weight is demanded. Conventional compact thermal insulating materials do not fulfill the requirements as regards weight.

SUMMARY OF THE INVENTION

One object of the invention is to provide a thermal insulating material of the initially mentioned type which offers effective protection against high temperatures.

A further object of the invention is to provide such a material which furthermore has a low weight.

In order to achieve these and other objects appearing from the present specification the invention provides such a material which is characterized in that in order to provide thermal protection against thermal effects of short duration the thermal insulation is composed of a plurality of reflective layers.

The thermal energy radiated onto the stack of reflective layers is at least partly reflected at the said layers. Finally multiple reflection makes it possible for thermal radiation which has penetrated the initial layers to gradually be almost completely reflected back again so that only an insubstantial amount of energy is able to make its way into the space screened by the insulation.

Although thermal insulation arrangements consisting of a plurality of layers have been proposed for low temperature technology for the insulation of a room to be kept at a temperature under normal room temperature by insulating it from the outside, on the warm side of the insulation it is a question of temperatures not far removed from normal or room temperature so that for the reflective layers there is a wide choice of materials available which are furthermore quite stable in such temperature ranges and in the case of which the reflective properties etc. remain constant for long periods of time.

As regards the use of such thermal insulating materials at high temperatures of the order of 1000° C. and above there are at least two prohibiting factors. Refractory metals suitable for use as the reflective layer oxidize and thus have a short working life. Furthermore, reflective layers are heated during the course of time to the temperature against which a screening effect is needed and they thus lose their thermal insulating properties.

The invention makes it possible to overcome these factors insofar that multiple reflection is used as a way of providing thermal protection against exposure to high temperature levels of short duration, the reflective layers being composed of refractory ceramic material. This makes it possible to use the material even in applications involving high temperatures to make it possible to profit from the advantage of a low weight of such insulating material.

Preferably the reflective layers consist of very thin films with a thickness range of 20 to 200 microns.

In accordance with a further feature of the invention the ceramic films are coated on one side with a refractory material, more especially a noble metal or an alloy thereof, such coating having a thickness of 0.2 micron or somewhat more. The composite ceramic metal material thus makes it possible to produce and utilize excellent reflective film insulation means in space travel. The ceramic substrate with a highly reflective surface thus makes possible insulation which is substantially lighter in weight and substantially cheaper than solid metallic reflective layers while at the same time having the good reflecting properties of metal. Such reflective layers are also stable since the noble metal does not oxidize.

A platinum-rhodium alloy is preferred for the metal coating because of the high reflectivity of rhodium and of the increase in strength due to the mixed crystal alloy.

In accordance with a further development of the invention the ceramic layer consists of an impregnated and fired stack of separate fiber ceramic plies, as for instance mullite or $Al_2O_3$. The individual ply consists of long fibers, which are randomly orientated in the sheet and homogeneously distributed. A number of such individual plies are stacked and preferably impregnated using a sol-gel method. The impregnating material may also be mullite or aluminum oxide. The fiber pad so produced is then dried at a raised temperature if desired and fired.

Owing to the reinforcement afforded by the ceramic fibers and the ultrahomogeneous and fine-grained impregnating material, which is introduced by the sol-gel method, such fiber pads or sheets so produced have a much lesser tendency to form cracks than is the case with commonly used ceramics and thus constitute a useful reflective layer or ply. The thickness of such ceramic plies may be up to a minimum of 20 microns.

In order to make possible a larger fraction of impregnating material in the stack of fibers, it's possible to use one or more further impregnating steps. Owing to the large proportion of liquid in the gel the fiber pad shrinks to a marked extent during the drying operation. Such shrinkage may be countered if fine ceramic powder with a particle size of the order of 0.1 micron is added to the gel. For the firing operation the impregnated and dried fiber pad or sheet is placed on a substrate, which has a non-adhesive surface in order to prevent any damage to the relatively thin fiber pads in the course of the shrinking process. Otherwise fissures would be produced if the pad were to adhere to the substrate and oppose the shrinkage.

In keeping with a further feature of the invention the reflective coating is coated on one side with a number of thin oxide layers, which have different refractive indices. This coating is preferably produced on a ceramic substrate that has already been provided with a metal coating. These oxide layers make possible a substantial increase in the reflectivity so that when oxide coatings are present a smaller number of reflective coatings are needed in a given application.

As spacers between the reflective layers it is more especially possible to use refractory fiber wadding, which may also be made of mullite or aluminum oxide, or for temperatures under 1000° C. silica as well, which offers a support for the thin reflective films with a small spacing between them while at the same time essentially simplifying manufacture of the reflective layers for producing an insulating unit.

The drawing shows one example of the invention in a diagrammatic form.

BRIEF DESCRIPTION OF THE DRAWINGS

FIG. 1 shows on embodiment of the invention in perspective.

FIG. 2 shows an exploded view of two sheets forming part of the novel structure.

FIG. 3 is a section through the same.

DETAILED DESCRIPTION OF THE INVENTION

FIG. 1 shows sheet-like thermal insulation 10 which consists of four reflective layers 11 held apart by fiber wadding 12 as a spacing means. The effect of heat incident from one side is opposed by the thermal insulation 10 by multiple reflection 14 of the heat radiation at the reflective layers 11 so that the space 15 on the other side of the thermal insulation 10 is protected from the action of heat.

The reflective layers 11 consist essentially of ceramic material. In order to produce the ceramic films in this form of the invention a plurality of separate layers 20 are produced from 3 micron thick ceramic fibers 21. A single ply 20 consists of one fiber ply, in which the long fibers 21 are distributed with a random orientation evenly in a plane. Dependent on the desired thickness of the ceramic layer 30 a suitable number of such single plies 20 is stacked and impregnated in order to consolidate the stack with an impregnating material 33, then dried and lastly fired.

The thermal insulating properties of the thermal insulation 10 described in the present instance is dependent on the reflectivity of th reflective plies 11 and the number thereof.

In order to make do with a minimum number of reflective layers 11 the ceramic film 30 is coated with a noble metal or an alloy, as for example PtRh as shown at 31. This metal coating may be extremely thin but should not be less than b 0.2 micron in thickness in order to keep the transmission coefficient for the radiant heat as low as possible. A further improvement may be produced by having further thin coatings 32 on the metal coating 31, such further coatings consisting, for example, of metal oxides and having different refractive indices. This makes it possible to have a reflectivity (r) approaching 1. I is in this manner that a further reduction in the number of reflective layers becomes possible.

What is claimed is:

1. A thermal insulating composite structure for high temperature use for protection against the effect of heat of short duration, said composite insulating structure comprising a plurality of superposed reflective layers comprising a substrate of relatively thin impregnated and fired ceramic fibers having a thickness of 20–200 microns and a metal refracting coating of a thickness of about 0.2 microns on said substrate.

2. The insulating structure as claimed in claim 1 wherein the fiber in said layers consists of a material selected from the group consisting of mullite and aluminum oxide.

3. The insulating material as claimed in claim 1 wherein said refractory coating is selected from the group consisting of a noble metal and a noble metal alloy.

4. The insulating material as claimed in claim 1 comprising a plurality of thin oxide coatings having respectively different indices of refraction covering said refractory coating.

5. The insulating structure as claimed in claim 1 comprising refractory fiber wadding between the reflective layers as a spacing means.

6. The insulating structure as claimed in claim 1 wherein the fibers in each fiber layer are randomly oriented in a homogeneous distribution.

7. The insulating structure as claimed in claim 6 wherein the fibers in said layers are mullite or aluminum oxide, and the fibers are impregnated with mullite or aluminum oxide.

* * * * *